United States Patent
Holl et al.

(10) Patent No.: US 12,498,071 B1
(45) Date of Patent: Dec. 16, 2025

(54) HYGIENIC PROCESS COUPLING ASSEMBLY

(71) Applicant: Sani-Matic, Inc., Sun Prairie, WI (US)

(72) Inventors: Wendell J. Holl, Lodi, WI (US); Peter T. Barrie, McFarland, WI (US); Tony W. Orlandoni, Waunakee, WI (US); Michael J. Borkowski, McFarland, WI (US); Eric M. Wild, Edgerton, WI (US)

(73) Assignee: Sani-Matic, Inc., Sun Prairie, WI (US)

( * ) Notice: Subject to any disclaimer, the term of this patent is extended or adjusted under 35 U.S.C. 154(b) by 507 days.

(21) Appl. No.: 18/053,803

(22) Filed: Nov. 9, 2022

Related U.S. Application Data (60) Provisional application No. 63/263,965, filed on Nov. 12, 2021.

(51) Int. Cl.
*F16L 55/115* (2006.01)
*B01D 35/28* (2006.01)

(52) U.S. Cl.
CPC .......... *F16L 55/1157* (2013.01); *B01D 35/28* (2013.01); *F16L 55/1155* (2013.01); *B01D 2201/291* (2013.01); *B01D 2201/347* (2013.01)

(58) Field of Classification Search
CPC ... F16L 55/1157; F16L 55/1155; B01D 35/28; B01D 2201/291; B01D 2201/347
USPC .... 210/348, 450, 493.2, 495, 471, 459, 460, 210/462, 463, 435, 439, 446, 448, 449; 285/26, 29, 80
See application file for complete search history.

(56) References Cited

U.S. PATENT DOCUMENTS

| 3,632,142 A | * | 1/1972 | Ichihara | F16L 37/113 |
| | | | | 285/88 |
| 2004/0144105 A1 | * | 7/2004 | Ballet | B01D 29/117 |
| | | | | 62/85 |

OTHER PUBLICATIONS

Catalog excerpt from Angle-Line Strainer Operation and Installation Instructions; Sani-Matic Inc.; Jan. 20, 2020.
Catalog excerpt from In-Line Strainers; Sani-Matic Inc.; Feb. 17, 2017.

\* cited by examiner

*Primary Examiner* — Madeline Gonzalez
(74) *Attorney, Agent, or Firm* — Harris Beach Murtha Cullina PLLC (57) ABSTRACT

Provided is a hygienic process coupling assembly that includes a retainer having a ring-shaped retainer wall with a first end configured for permanent securement to at least one of a process pipe or portion of process equipment, and a second end that includes a flange protruding radially therefrom, a plurality of guide rails with slots therebetween extending along the flange, the plurality of guide rails including a guide surface extending from a beveled guide step to a stop wall, the beveled guide step including a first ramp and a second ramp opposite the first ramp, an end cap including a head portion with a top surface and a bottom surface; a cylindrical neck portion extending down from the bottom surface; an actuation element situated along the top surface, a plurality of latching arms extending downward, and a plurality of latching fingers extending inward from the plurality of latching arms.

18 Claims, 10 Drawing Sheets

HYGIENIC PROCESS COUPLING ASSEMBLY

CROSS-REFERENCE

This application claims priority to and incorporates by reference herein U.S. Provisional Patent Application Ser. No. 63/263,965 filed on Nov. 12, 2021.

FIELD OF THE INVENTION

The hygienic process coupling assembly relates generally to process equipment, and more particularly to hygienic and sanitizable process equipment connections.

BACKGROUND

Environments using hygienic process equipment are subject to various criteria and strive to utilize hygienic process equipment that is easy to clean and less susceptible to engaging or harboring foreign materials. Hygienic process equipment can often include a strainer insert to trap particulates. Current strainer end caps require a pin and/or clip to hold the end cap in place. These pins and clips are difficult for end users to install, plus they pose as a potential foreign object contaminant if they are lost, as such a new hygienic process coupling assembly is desired that would not require pins and clips.

In addition, sanitary clamp style ferrules are currently being used in industries that require hygienic equipment where a need for both inside and outside connection sanitary design is required. An exemplary application in this case would be the coupling of a spray ball to a supply pipe. While current pipe fitting/ferrules are considered hygienic on the inside of the pipe, the outside of the pipe is not hygienic due to the presence of threads and/or clamps. As such, it would be desirable to provide a process pipe connector that eliminates the need for threads and clamps.

It will be understood by those skilled in the art that one or more aspects of this invention can meet certain objectives, while one or more other aspects can lead to certain other objectives. Other objects, features, benefits, and advantages of the present invention will be apparent in this summary and descriptions of the disclosed embodiments, and will be readily apparent to those skilled in the art. Such objects, features, benefits, and advantages will be apparent from the above as taken in conjunction with the accompanying figures and all reasonable inferences to be drawn therefrom.

BRIEF SUMMARY

In at least some embodiments, disclosed is a hygienic process coupling assembly that includes: a retainer having a ring-shaped retainer wall with a first end configured for permanent securement to at least one of a process pipe or portion of process equipment, and a second end that includes a flange protruding radially therefrom; a plurality of guide rails with slots therebetween extending along the flange, the plurality of guide rails including a guide surface extending from a beveled guide step to a stop wall, the beveled guide step including a first ramp and a second ramp opposite the first ramp; an end cap comprising: a head portion with a top surface and a bottom surface; a cylindrical neck portion extending down from the bottom surface; a cylindrical plug portion extending down from the neck portion; an actuation element situated along the top surface; a plurality of latching arms extending downward; and a plurality of latching fingers extending inward from the plurality of latching arms, positioned to securably engage the plurality of guide rails of the retainer during a twisting motion imparted on the actuation element; and a seal positioned in abutment with the bottom surface of the head portion and extending radially from the neck portion.

In at least some other embodiments, disclosed is a hygienic process coupling assembly that includes: a retainer having a ring-shaped retainer wall with a first end and a second end, the second end including a flange protruding radially therefrom; a plurality of guide rails extending along the flange, the plurality of guide rails including a guide surface extending from a beveled guide step to a stop wall; and an end cap comprising: a head portion with a top surface, a bottom surface, and an actuation element; a plurality of latching arms extending downward; and a plurality of latching fingers extending inward from the plurality of latching arms, positioned to securably engage the plurality of guide rails of the retainer during a twisting motion imparted on the actuation element.

In at least some further embodiments, disclosed is a hygienic process coupling assembly that includes: a first retainer and a second retainer, each comprising: a ring-shaped retainer wall with a first end configured for permanent securement to at least one of a process pipe or portion of process equipment; a second end that includes a flange protruding radially therefrom; and a plurality of guide rails with slots therebetween extending along the flange, the plurality of guide rails including a guide surface extending from a beveled guide step to a stop wall; and a coupler ring having primary latching arms and secondary latching arms, wherein the primary latching arms include primary latching fingers and extend about a first side of the coupler ring, and the secondary latching arms include secondary latching fingers and extend about an opposite second side of the coupler ring; wherein the primary latching arms are positioned to securably engage the plurality of guide rails of the first retainer during a twisting motion imparted on the coupler ring, and the secondary latching arms are positioned to securably engage the plurality of guide rails of the second retainer during the twisting motion imparted on the coupler ring.

Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in application to the details of construction, or the arrangement of the components illustrated in the drawings. The invention is capable of other embodiments or of being practiced or carried out in other various ways.

DETAILED DESCRIPTION

Referring to FIGS. 1-5, various views of an exemplary hygienic process coupling assembly 10 are provided in both assembled and unassembled states. In at least some embodiments, the coupling assembly 10 includes a retainer 12, an end cap 14, and a circumferential seal 16. The retainer 12 is configured to securably receive and engage with the end cap 14, with seal 16 (e.g., gasket) situated therebetween to provide a liquid tight seal. The seal 16 can be comprised of various types of materials, such as an EPDM x-ring seal (or other type of flexible or non-flexible seal, e.g., O-ring, etc.). The coupling assembly 10 can be utilized with various types of process piping and equipment to provide quick and easy access and a hygienic liquid tight closure.

Referring to FIGS. 6-9, various views of the exemplary retainer 12 are provided. In at least some embodiments, the retainer 12 includes a ring-shaped retainer wall 20 with a first end 22 configured for permanent securement to a process pipe or portion of process equipment, and a second end 24 that includes a flange 26 protruding radially therefrom. The flange 26 provides both a sealing surface for the seal 16 and an engagement portion. The flange 26 includes a plurality of slots 27 with guide rails 28 extending therebetween for engagement with the end cap 14 or another component, as described in detail below. In at least some embodiments, the retainer 12 includes four guide rails 28, while in other embodiments, more or less guide rails 28 can be provided. In at least some embodiments, each guide rail 28 includes a guide surface 30 extending from a beveled guide step 32 to a stop wall 34. The guide step 32 can include first and second ramps 36, 38 on opposite sides to assist with the locking engagement of the end cap 14 to the retainer 12.

In at least some embodiments, the retainer 12 can include a plurality of drain holes 42 sized as desired, for example six drain holes having a diameter of about 0.094 inches. The drain holes can provide drainability for a connected component, such as strainer (e.g., when the strainer with the retainer is installed in a vertical position). In at least some embodiments, the retainer 12 can be manufactured using any of various materials, for example in at least some embodiments, it can include machined 316L stainless steel polished to a surface roughness of about twenty Ra, while in other embodiments, the retainer 12 can be manufactured using other materials and/or shapes, and/or be polished to provide other levels of roughness.

Referring to FIGS. 10-13, various views of the exemplary end cap 14 are provided. In at least some embodiments, the end cap 14 includes a head portion 50 with an actuation element 52 (e.g., a handle, protrusion, shaped-depression, etc.) extending along or otherwise engaged with a top surface 54, a cylindrical neck portion 56 extending down from a bottom surface 58 of the head portion 50, and a cylindrical plug portion 59 extending from the neck portion 56. A plurality of latching arms 60 extend generally downward from the head portion 50, each including a latching finger 62 directed generally towards the neck portion 56. In at least some embodiments, the end cap 14 includes four latching arms 60, while in other embodiments, more or less latching arms 60 can be provided along with a matching number of guide rails 28. The latching arms 60 are sized, shaped, and positioned to securably engage the guide rails 28 of the retainer 12 during a twisting motion when installing the end cap 14. In at least some embodiments the end cap 14 can be made from Polyetherimide (PEI) with a surface finish of twenty Ra, while in other embodiments, the end cap 14 can be comprised of other materials and/or be polished to provide other levels of roughness. The use of PEI can serve to reduce friction and allow for a sliding engagement to prevent scratching or galling during securement to the retainer 12 and/or to the inside of any installation in which the coupling assembly is used.

Prior to securing the end cap 14 to the retainer 12, the seal 16 can be positioned in abutment with the bottom surface 58 of the head portion 50 and extending radially from the neck portion 56, the seal 16 provides both a water sealing barrier and serves to assist with securement of the end cap 14 by providing an expandable force after the end cap 14 has been forcibly twist-locked to the retainer 12. More particularly, slight flexibility and compression of the seal 16 can assist to lock the end cap 14 to the retainer 12 by providing an expanding tension above and below the seal 16.

Slots 27 in the flange 26 of the retainer 12 allow the latching arms 60 of the end cap 14 to pass over the flange 26 (as the guide rails 28 along the flange extend further outwards) for installation of the end cap 14, wherein the latching fingers 62 are positioned under or partially aligned with the guide surfaces 30 of the guide rails 28 After passing through the slots 27, the end cap 14 is then rotated, such as a 35-45 degree rotation for example, to provide engagement between the latching fingers 62 and the guide rails 28. More particularly, during rotation of the end cap 14, each of the latching fingers 62 engage the first ramp 36 of each guide step 32, which force the bottom surface 58 of the head portion 50 towards the flange 26, compressing the seal 16. Continued rotation of the end cap 14 causes the latching arms 60 to pass over the second ramps 38 of the guide steps 32. The second ramps 38 providing an initial resistance to the end cap 14 inadvertently rotating back over the guide steps 32 and releasing the end cap 14 from the retainer 12. In at least some embodiments, the first and second ramps 36, 38 can extend non-perpendicular to the retainer wall 20 and/or be angled with respect to the guide surface 30. Further, in at least some embodiments, the plug portion 59 includes an outer circumference 70 that is matingly received in an inner circumference 72 of the retainer 12 to assist with alignment and sealing.

Figure 1:
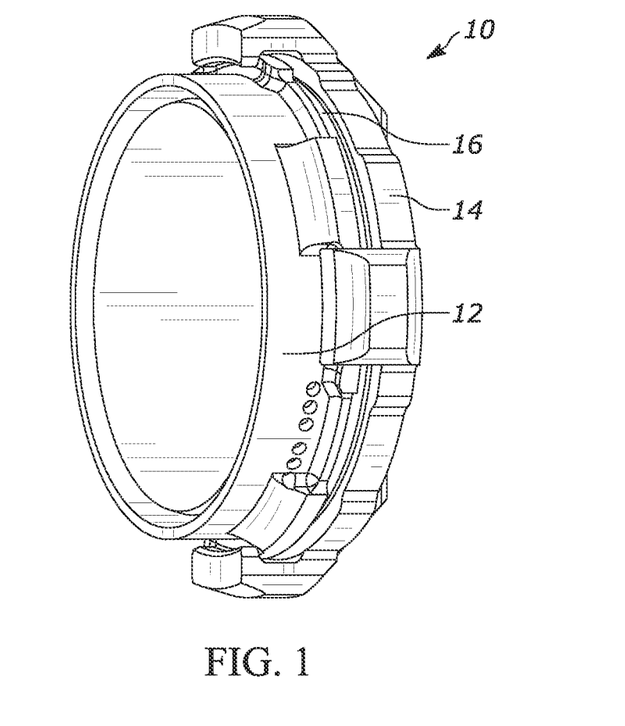
FIG. 1 is a perspective view of an exemplary embodiment of a hygienic process coupling assembly in an assembled state.
Figure 2:
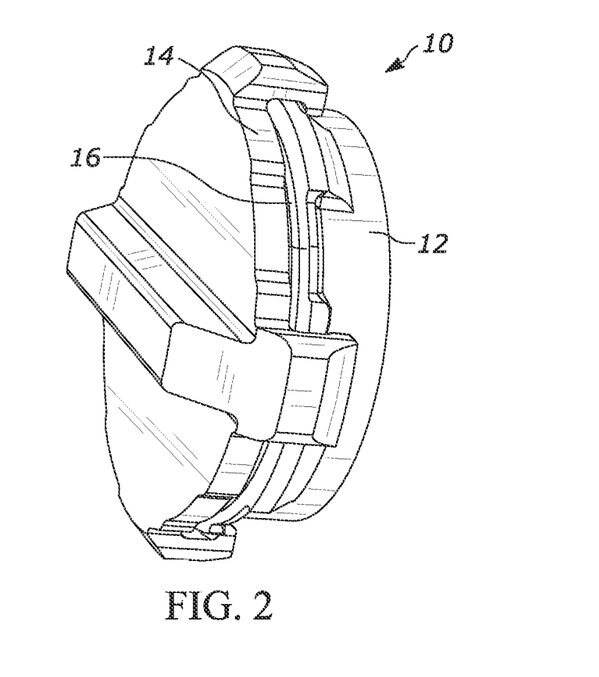
FIG. 2 is another perspective view of the hygienic process coupling assembly of FIG. 1.
Figure 3:
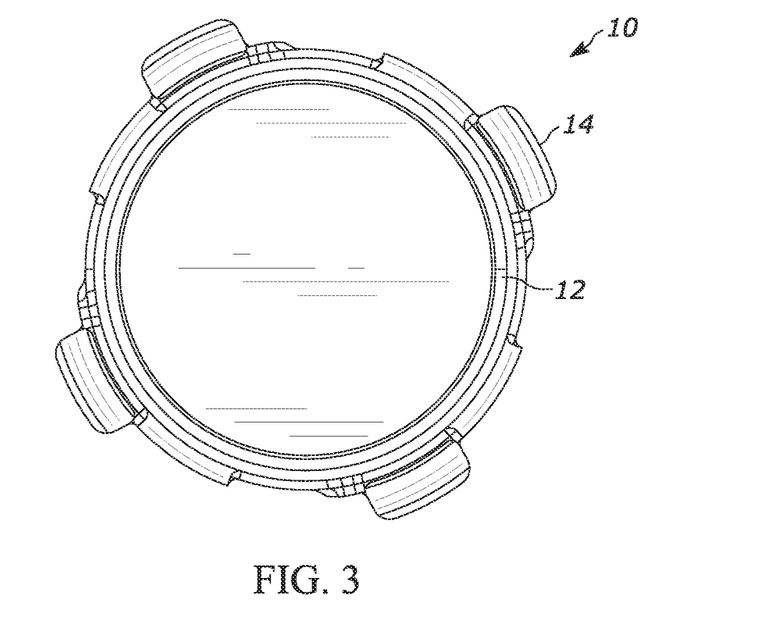
FIG. 3 is a bottom view of the hygienic process coupling assembly of FIG. 1.
Figure 4:
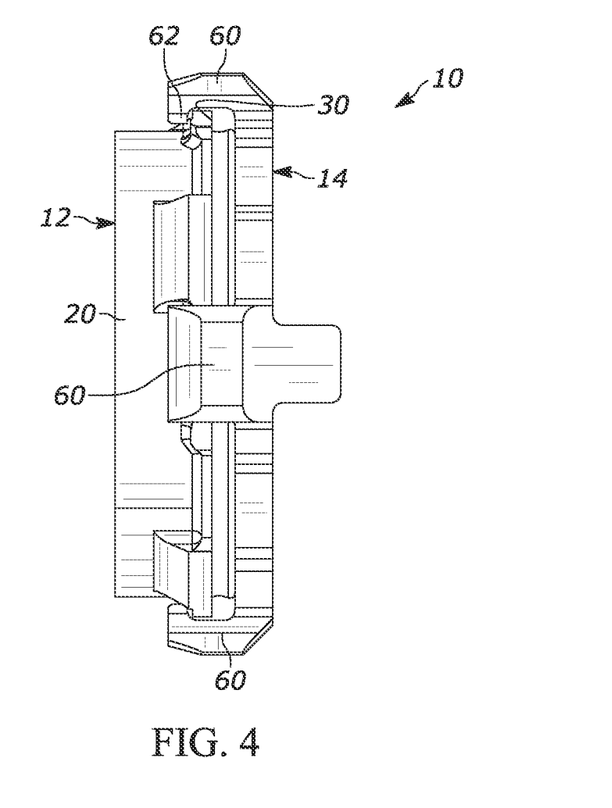
FIG. 4 is a side view of the hygienic process coupling assembly of FIG. 1.
Figure 5:
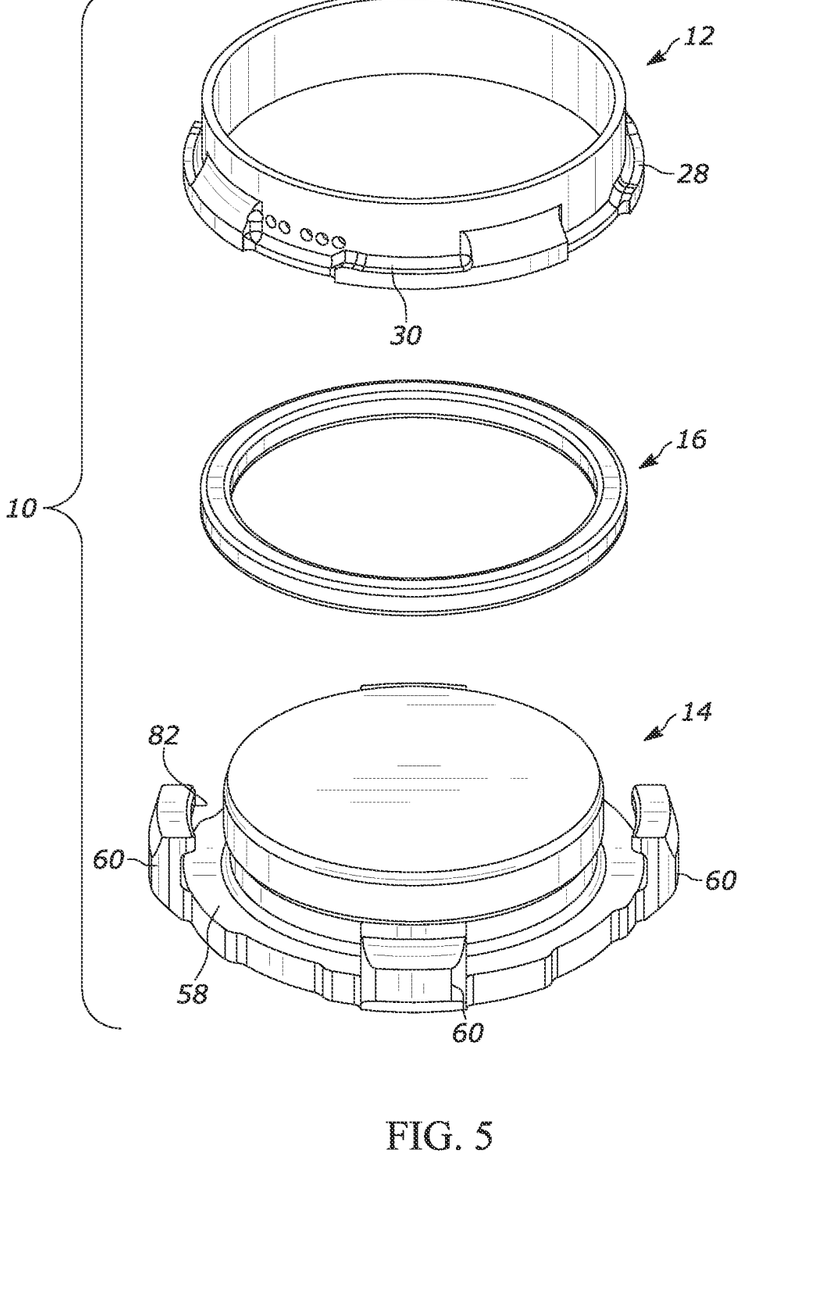
FIG. 5 is a bottom perspective view of the hygienic process coupling assembly of FIG. 1 in an unassembled state.
Figure 6:
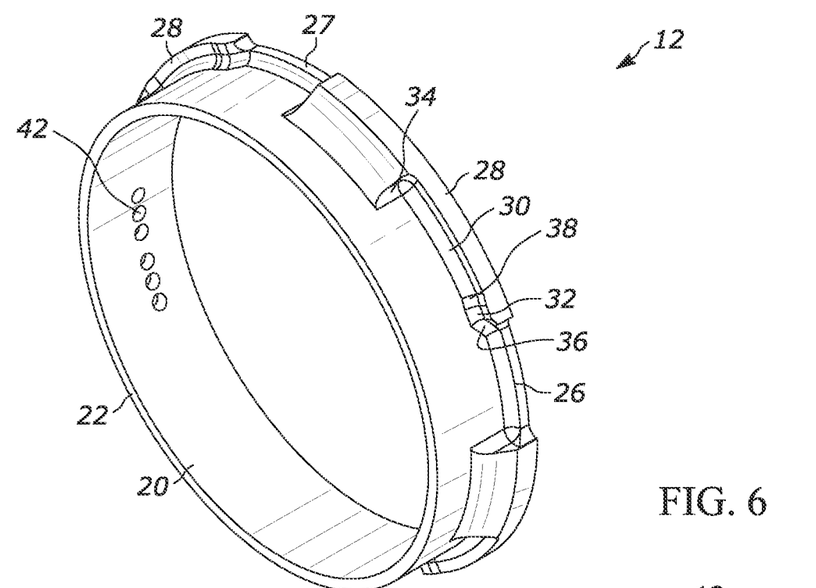
FIG. 6 is a perspective view of an exemplary retainer of the hygienic process coupling assembly of FIG. 1.
Figure 7:
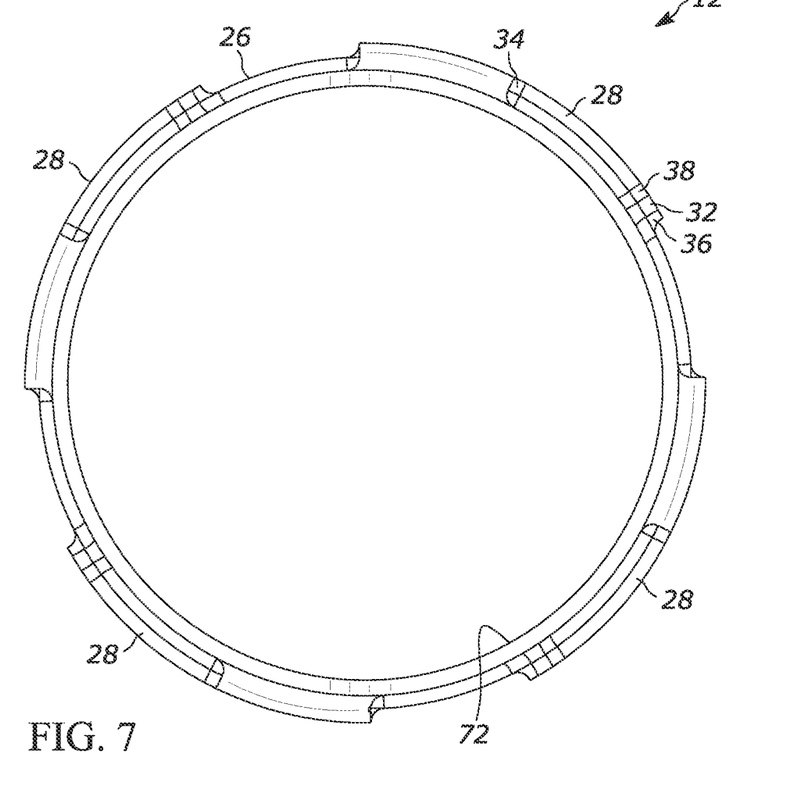
FIG. 7 is a bottom view of the retainer of FIG. 6.
Figure 8:
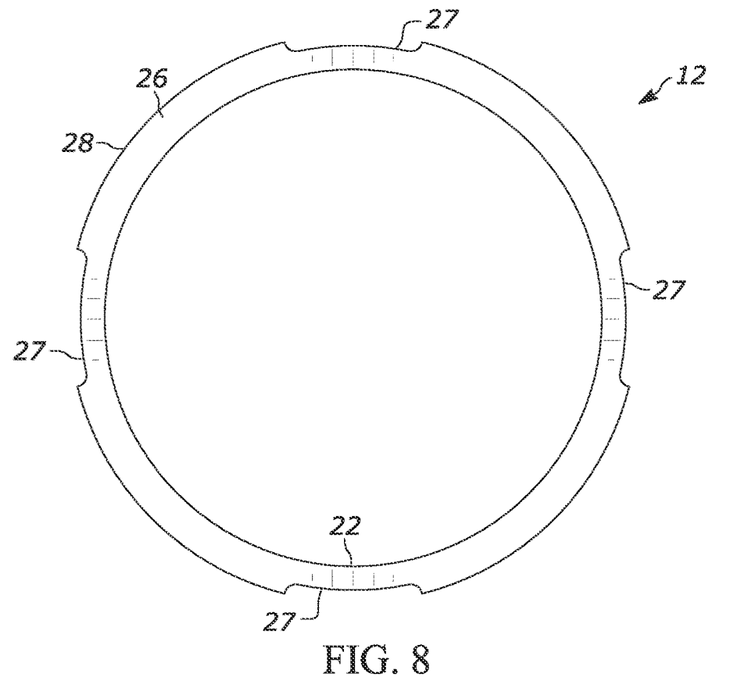
FIG. 8 is a top view of the retainer of FIG. 6.
Figure 9:
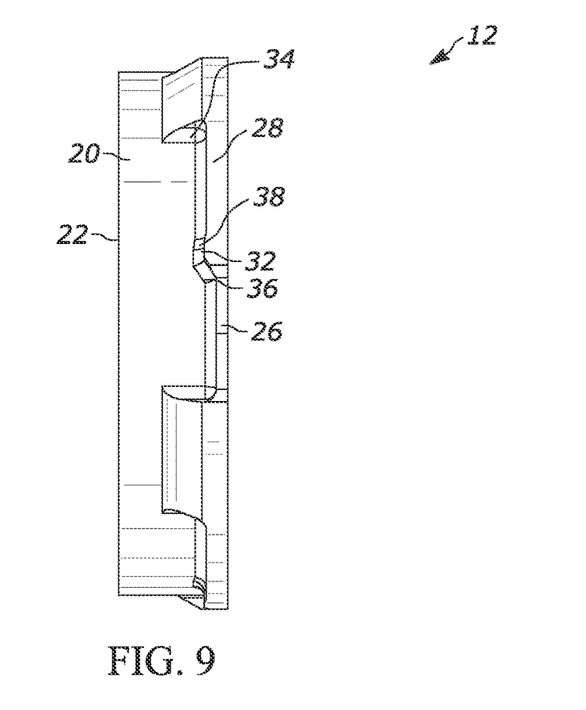
FIG. 9 is a side view of the retainer of FIG. 6.
Figure 10:
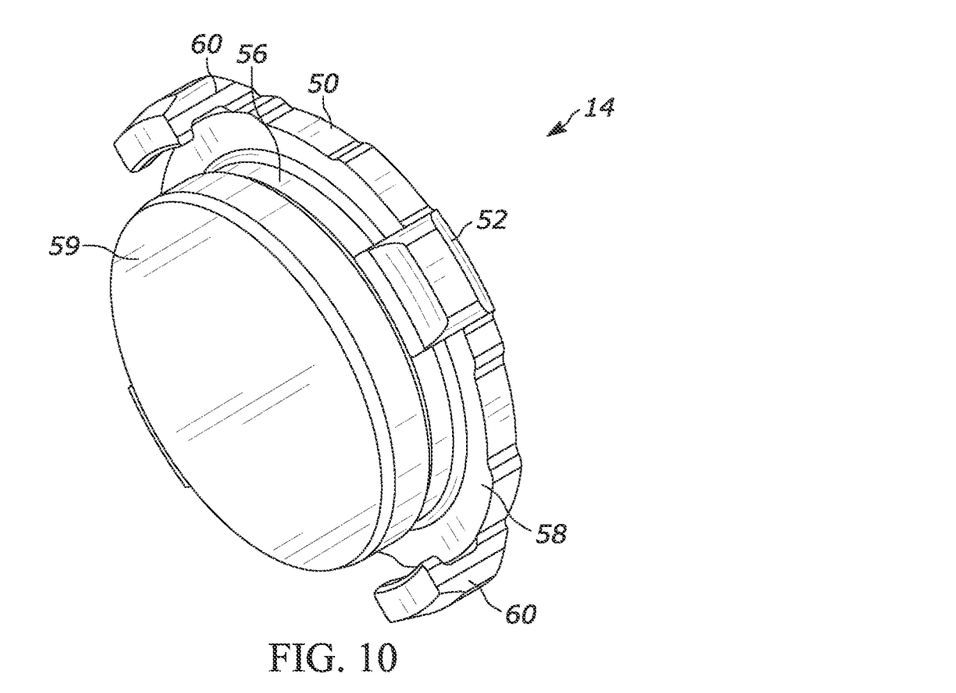
FIG. 10 is a perspective view of an exemplary end cap of the hygienic process coupling assembly of FIG. 1.
Figure 11:
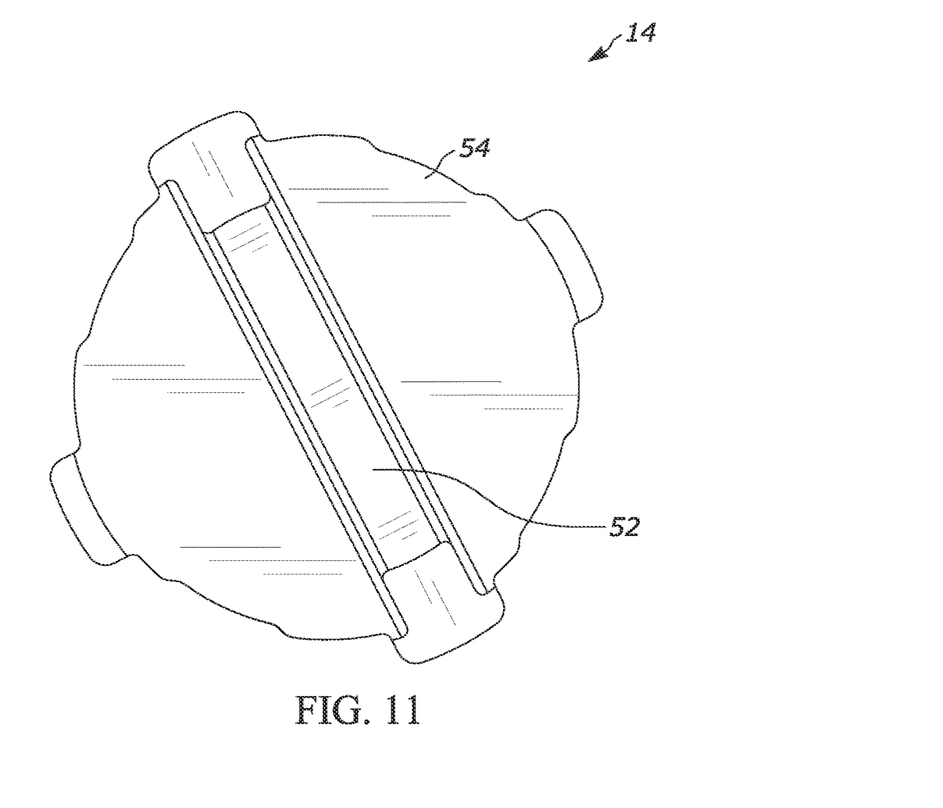
FIG. 11 is a top view of the end cap of FIG. 10.
Figure 12:
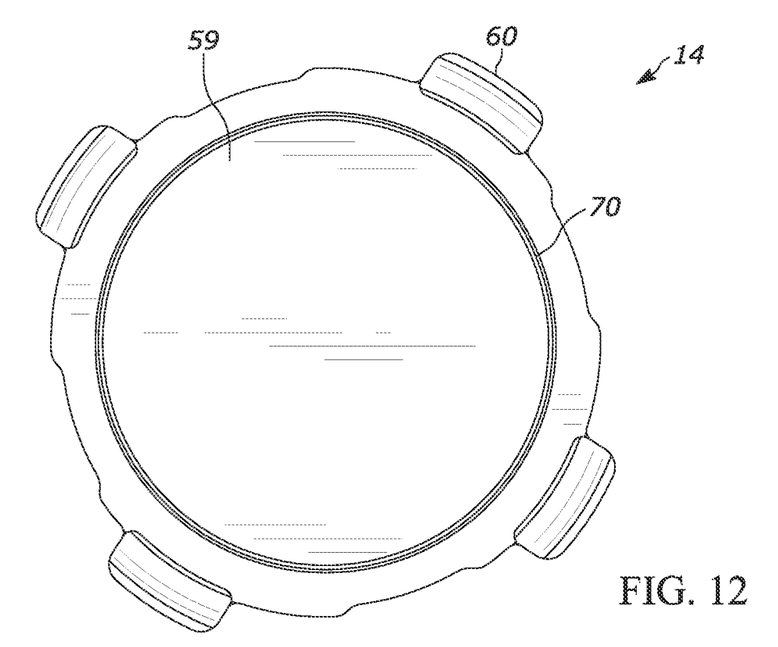
FIG. 12 is a bottom view of the end cap of FIG. 10.
Figure 13:
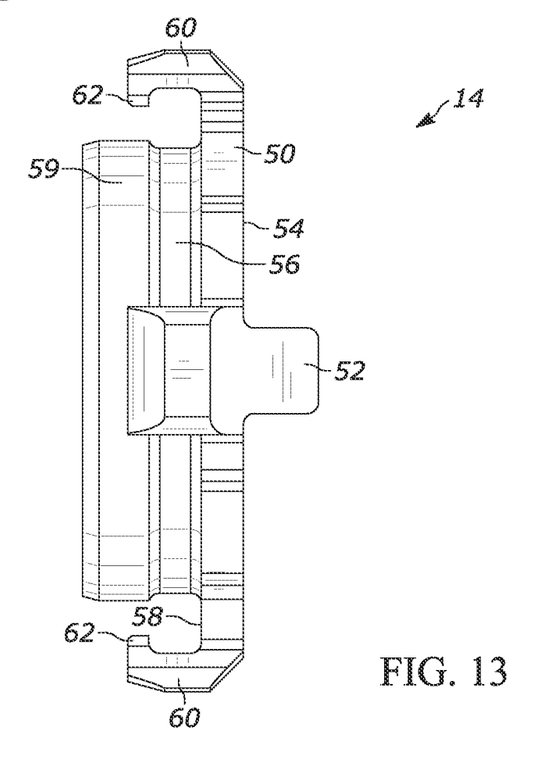
FIG. 13 is a side view of the end cap of FIG. 10.

The combination of the end cap 14 and retainer 12 provides an exemplary coupling assembly for use with piping and equipment, noting that the retainer 12 is to be secured to (e.g., welded, bonded, etc.) or integrally formed with various components, with the end cap 14 then securable to the retainer 12. For example, such as seen in FIGS. 12 and 13 illustrating perspective assembled and exploded views of the retainer 12 secured to a typical strainer 80 found in process equipment piping applications. In addition to use with a strainer, the coupling assembly 10 can be used as a standard process pipeline end cap (noting that drain holes would not be included) as a replacement for a sanitary clamp style end cap as commonly used in the process industry. In at least some embodiments, the coupling assembly 10 can be used as a ferrule style connection to join two separate pipes in instances where the outside of the pipes is required to be hygienic, the pipe connection is vertical, and the connection is required to be water-tight.

Figure 14:
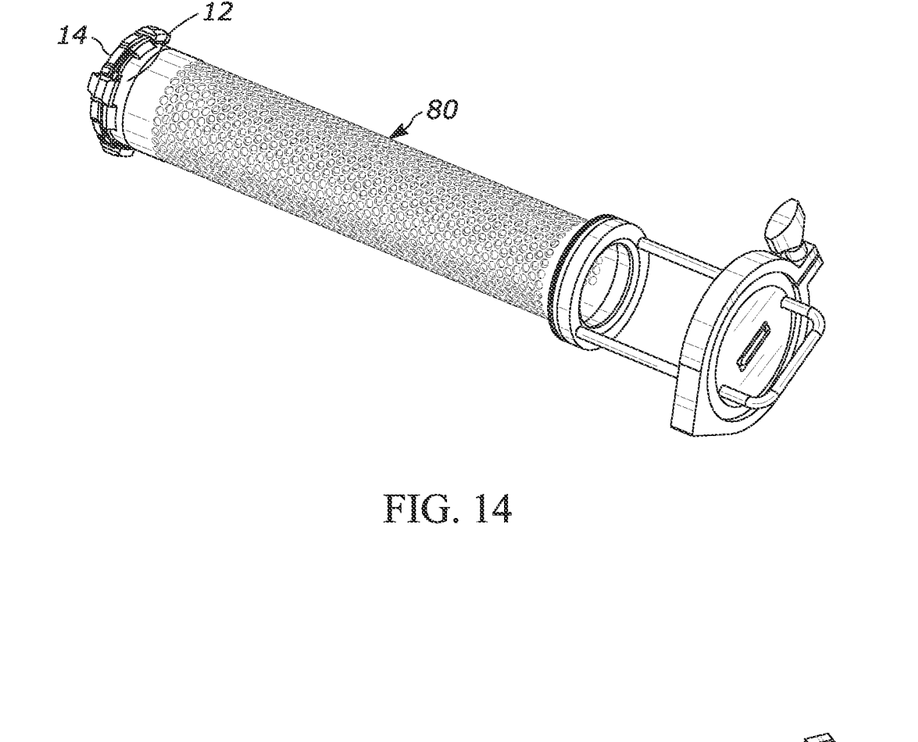
FIG. 14 is a perspective view of the hygienic process coupling assembly of FIG. 1 secured to a strainer.
Figure 15:
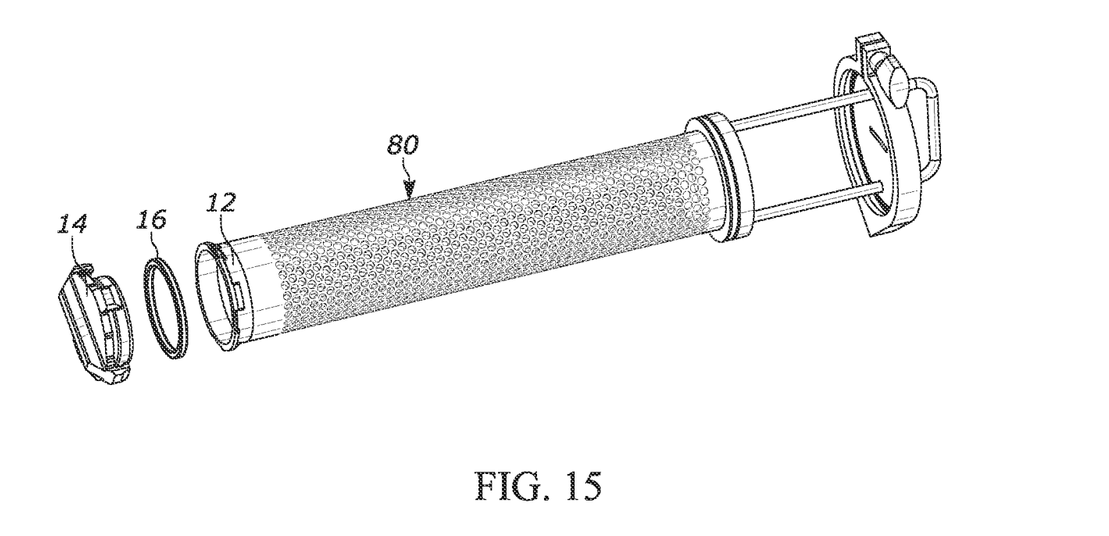
FIG. 15 is an exploded perspective view of the hygienic process coupling assembly and strainer of FIG. 14.
Figure 16:
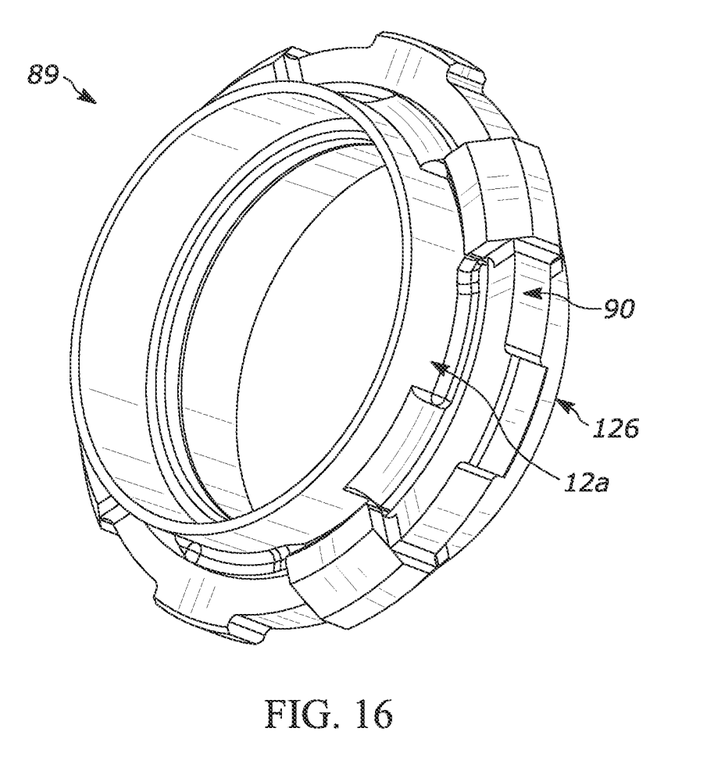
FIG. 16 is a perspective view of another exemplary hygienic process coupling assembly in an assembled state.
Figure 17:
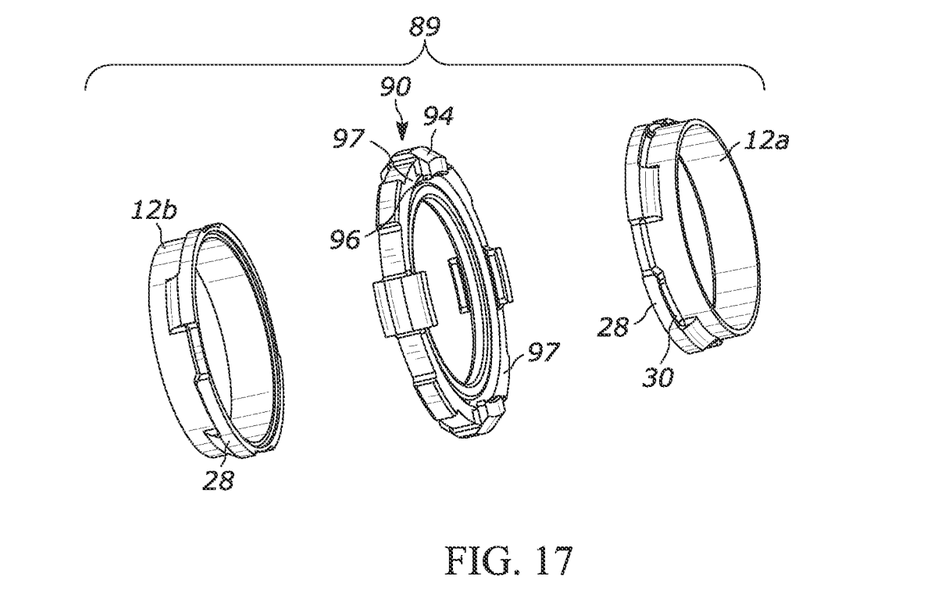
FIG. 17 is a perspective view of the hygienic process coupling assembly of FIG. 16 in an unassembled state.
Figure 18:
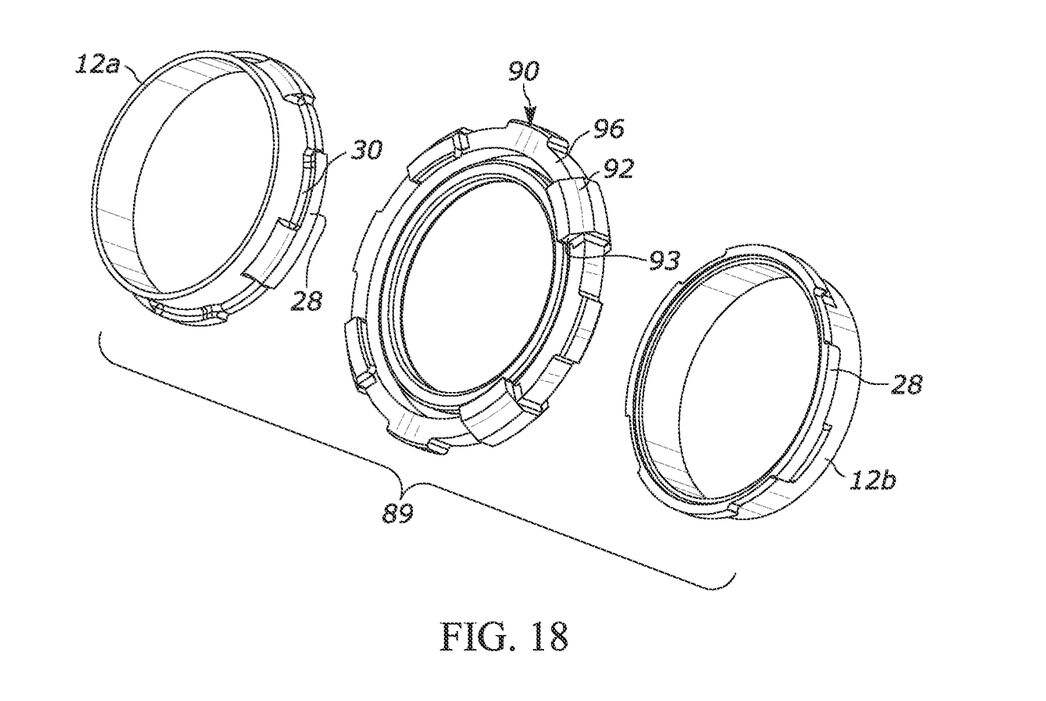
FIG. 18 is another perspective view of the hygienic process coupling assembly of FIG. 16 in an unassembled state.

In a further embodiment as seen in FIGS. 14-16, a hygienic processing coupling assembly 89 is illustrated in assembled and unassembled views. In at least some embodiments, the hygienic processing coupling assembly 89 includes a pair of retainers couplable together using a coupler ring 90 having primary latching arms 92 and secondary latching arms 94, wherein the primary latching arms 92 include primary latching fingers 93 and extend about a first side 95, and the secondary latching arms 94 include secondary latching fingers 96 and extend about an opposite second side 97. A first retainer 12a and second retainer 12b are respectively secured to piping or other components to which coupling therebetween is desired. The first and second retainers 12a, 12b are the same as the retainer 12 and as such include guide rails 28 and guide surfaces 30 that are engageable with the primary latching fingers 93 and secondary latching fingers 96. The guide rails 28 for the first and second retainers 12a, 12b are oriented to face the same rotational direction such that, rotation of the coupler ring 90 in a first direction engages the latching fingers 93, 96 with the guide rails 28 to provide a locking engagement that secures the retainers 12a, 12b to the coupler ring 90. The aforementioned seals 16 can be utilized between each of the retainers and the coupler ring to provide both a water sealing barrier and to assist with securement of the retainers 12a, 12b by providing an expandable force after the coupler ring 90 has been forcibly twist-locked to the retainers.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of any appended claims and the description of the invention herein.

What is claimed is:

1. A hygienic process coupling assembly comprising:
   a retainer having a ring-shaped retainer wall with a first end configured for permanent securement to at least one of a process pipe or portion of process equipment, and a second end that includes a flange protruding radially therefrom;
   a plurality of guide rails with slots therebetween extending along the flange, the plurality of guide rails including a guide surface extending from a beveled guide step to a stop wall, the beveled guide step including a first ramp and a second ramp opposite the first ramp;
   an end cap comprising:
      a head portion with a top surface and a bottom surface;
      a cylindrical neck portion extending down from the bottom surface;
      a cylindrical plug portion extending down from the neck portion;
      an actuation element situated along the top surface;
      a plurality of latching arms extending downward; and
      a plurality of latching fingers extending inward from the plurality of latching arms, positioned to securably engage the plurality of guide rails of the retainer during a twisting motion imparted on the actuation element; and
   a seal positioned in abutment with the bottom surface of the head portion and extending radially from the neck portion.

2. The hygienic process coupling assembly of claim 1, wherein the end cap includes four latching arms and the retainer includes four guide rails.

3. The hygienic process coupling assembly of claim 2, wherein the end cap is comprised of plastic.

4. The hygienic process coupling assembly of claim 3, further comprising a plurality of drain holes extending through the retainer wall of the retainer.

5. The hygienic process coupling assembly of claim 3, wherein the first end of the retainer wall is permanently connected to a strainer.

6. The hygienic process coupling assembly of claim 1, wherein the seal is a solid synthetic rubber seal.

7. A hygienic process coupling assembly comprising:
   a retainer having a ring-shaped retainer wall with a first end and a second end, the second end including a flange protruding radially therefrom;
   a plurality of guide rails extending along the flange, the plurality of guide rails including a guide surface extending from a beveled guide step to a stop wall; and
   an end cap comprising:
      a head portion comprising a solid transverse wall with a top surface, a bottom surface, and an actuation element engaged with the top surface;
      a plurality of latching arms extending downward; and
      a plurality of latching fingers extending inward from the plurality of latching arms, positioned to securably engage the plurality of guide rails of the retainer during a twisting motion imparted on the actuation element.

8. The hygienic process coupling assembly of claim 7, further comprising a seal positioned in abutment with the bottom surface of the head portion.

9. The hygienic process coupling assembly of claim 8, wherein the end cap includes four latching arms and the retainer includes four guide rails.

10. The hygienic process coupling assembly of claim 8, wherein the seal is a solid synthetic rubber seal.

11. The hygienic process coupling assembly of claim 8, wherein the end cap is comprised of plastic.

12. The hygienic process coupling assembly of claim 11, wherein the beveled guide step of the retainer includes a first ramp and a second ramp, the second ramp positioned opposite the first ramp.

13. The hygienic process coupling assembly of claim 7, wherein the end cap includes two latching arms and the retainer includes two guide rails.

14. The hygienic process coupling assembly of claim 7, wherein the end cap includes three latching arms and the retainer includes three guide rails.

15. The hygienic process coupling assembly of claim 7, wherein the first end of the retainer wall is permanently connected to a strainer.

16. The hygienic process coupling assembly of claim 15, further comprising a plurality of drain holes extending through the retainer wall of the retainer.

17. A hygienic process coupling assembly comprising:
- a retainer having a ring-shaped retainer wall with a first end and a second end, the second end including a flange protruding radially therefrom;
- a plurality of guide rails extending along the flange, with slots therebetween, the plurality of guide rails including a guide surface extending from a beveled guide step to a stop wall; and
- an end cap comprising:
  - a head portion with a top surface, a bottom surface, and an actuation element;
  - a plurality of latching arms extending downward; and
  - a plurality of latching fingers extending inward from the plurality of latching arms, positioned to securably engage the plurality of guide rails of the retainer during a twisting motion imparted on the actuation element.

18. A hygienic process coupling assembly comprising:
- a retainer having a ring-shaped retainer wall with a first end and a second end, the second end including a flange protruding radially therefrom;
- a plurality of guide rails extending along the flange, the plurality of guide rails including a guide surface from a beveled guide step to a stop wall, wherein the beveled guide step of the retainer includes a first ramp and a second ramp, the second ramp positioned opposite the first ramp; and
- an end cap comprising:
  - a head portion with a top surface, a bottom surface, and an actuation element;
  - a plurality of latching arms extending downward; and
  - a plurality of latching fingers extending inward from the plurality of latching arms, positioned to securably engage the plurality of guide rails of the retainer during a twisting motion imparted on the actuation element.

* * * * *